(12) United States Patent
Keller et al.

(10) Patent No.: US 8,860,725 B2
(45) Date of Patent: Oct. 14, 2014

(54) SYSTEM, METHOD, AND COMPUTER PROGRAM PRODUCT FOR DETERMINISTICALLY SIMULATING LIGHT TRANSPORT

(75) Inventors: Alexander Keller, Berlin (DE);
Leonhard Grünschloβ, Berlin (DE);
Marc Droske, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 285 days.

(21) Appl. No.: 12/856,529

(22) Filed: Aug. 13, 2010

(65) Prior Publication Data

US 2012/0038643 A1    Feb. 16, 2012

(51) Int. Cl.
*G06T 15/50*    (2011.01)

(52) U.S. Cl.
CPC ....................................... *G06T 15/50* (2013.01)
USPC .......................................................... 345/426

(58) Field of Classification Search
None
See application file for complete search history.

(56) References Cited

U.S. PATENT DOCUMENTS

| | | | |
|---|---|---|---|
| 6,911,976 B2 | 6/2005 | Abramov | |
| 2005/0278406 A1 | 12/2005 | Keller | |
| 2006/0066616 A1 | 3/2006 | Sevastianov et al. | |
| 2007/0206008 A1* | 9/2007 | Kaufman et al. | 345/424 |
| 2008/0231633 A1 | 9/2008 | Keller et al. | |
| 2009/0141026 A1 | 6/2009 | Raab et al. | |
| 2009/0167763 A1 | 7/2009 | Waechter et al. | |
| 2010/0079452 A1 | 4/2010 | Zhou et al. | |
| 2010/0332523 A1 | 12/2010 | Peterson et al. | |
| 2013/0044117 A1 | 2/2013 | Mejdrich et al. | |

OTHER PUBLICATIONS

Schjoth, Lars, "Diffusion based Photon Mapping", 2005, IT University Copenhagen.*
"Brute Force Nested-Loops Joins", Jan. 2001, http://www.dcs.ed.ac.uk/home/tz/phd/thesis/node19.htm.*
Faure, Henri, "Discrépance de suites associées à un système de numération (en dimension s)," Acta Arithmetica, 1982, pp. 337-351.
Hickernell et al., "Extensible Lattice Sequences for Quasi-Monte Carlo Quadrature", 2000, pp. 1-22, vol. 22, Issue 3, SIAM Journal on Scientific Computing, Philadelphia, PA.
Hachisuka et al., "Stochastic Progressive Photon Mapping", Dec. 2009, pp. 1-8, SIGGRAPH Asia 2009, ACM SIGGRAPH Asia 2009 Papers, New York, NY.

(Continued)

*Primary Examiner* — Kee M Tung
*Assistant Examiner* — Ryan D McCulley
(74) *Attorney, Agent, or Firm* — Zilka-Kotab, PC

(57) ABSTRACT

A system, method, and computer program product are provided for deterministically simulating light transport. In use, all pairs of non-negative integers are enumerated (e.g. in a predetermined order). Additionally, for each of the enumerated pairs of non-negative integers, an associated pair of a query point and a photon is identified by: identifying a query point associated with a first non-negative integer of the pair of non-negative integers using a deterministic point sequence of query points and identifying a photon associated with a second non-negative integer of the pair of non-negative integers using a deterministic point sequence of photons. Further, for each of the query points in the deterministic point sequence of query points, photons in the deterministic point sequence of photons associated with the query point are identified. Still yet, an illumination value is computed for each query point of each of the photons associated with the query point using the pairs of query points and photons and at least one transport property at the query point.

20 Claims, 5 Drawing Sheets

(56) References Cited

OTHER PUBLICATIONS

Hachisuka et al., "Progressive Photon Mapping", Dec. 2008, pp. 1-8, vol. 27, Issue 5, ACM Transactions on Graphics (TOG), Proceedings of ACM SIGGRAPH Asia 2008, New York, NY.
Jensen, Henrik W., "Realistic Image Synthesis Using Photon Mapping", 2001, A K Peters, Natick, MA.
Keller, Alexander, "Strictly Deterministic Sampling Methods in Computer Graphics", Feb. 8, 2001, pp. 1-39.
Keller, Alexander, "Myths of Computer Graphics", 2006, pp. 217-243, Monte Carlo and Quasi-Monte Carlo Methods 2004.
Kollig et al., Efficient Bidirectional Path Tracing by Randomized Quasi-Monte Carlo Integration, 2002, pp. 290-305, and Quasi-Monte Carlo Methods 2000, Springer.
Niederreiter, Harald, "Random Number Generation and Quasi-Monte Carlo Methods", 1992, pp. 1-77, Society for Industrial and Applied Mathematics (SIAM), Philadelphia, PA.
Shirley, Peter, "Realistic Ray Tracing", 2000, pp. ix-xiii, 1-165, A K Peters, Ltd., Natick, MA.
Silverman, B.W., "Density Estimation for Statistics and Data Analysis", 1986, pp. 1-22, Monographics on Statistics and Applied Probability, London: Chapman and Hall.
Sobol, I. M., "Uniformly Distributed Sequences with an Additional Uniform Property", 1976, pp. 236-242, vol. 16, Issue 5, Zh. vychisl. Mat. mat. Fiz., Moscow, Russia.
Veach et al., "Robust Monte Carlo Methods for Light Transport Simulation", Dec. 1997, pp. 1-406, Doctoral Dissertation, Stanford, CA.
Wachter, Carsten Alexander, "Quasi-Monte Carlo Light Transport Simulation by Efficient Ray Tracing", 2007, pp. 1-136, Dissertation.
Wozniakowski, H., "Average Case Complexity of Multivariate Integration", Jan. 1991, pp. 185-194, vol. 24, No. 1, Bulletin of the American Mathematical Society.
Keller, A. et al., U.S. Appl. No. 13/253,897, filed Oct. 5, 2011.
Aila, T. et al., "Understanding the Efficiency of Ray Traversal on GPUs," 2009, pp. 1-5.
Alcantara, D. A. et al., "Real-Time Parallel Hashing on the GPU," 2009, pp. 1-9.
Bentley, J. L. et al., "Data Structures for Range Searching," Computing Surveys, Dec. 1979, vol. 11, No. 4, pp. 397-409.
Blelloch, G., "Prefix Sums and Their Applications," Carnegie Mellon University School of Computer Science, Technical Report CMU-CS-90-190, Nov. 1990, pp. 1-23.
Choi, B. et al., "Parallel SAH k-D Tree Construction for Fast Dynamic Scene Ray Tracing," Technical Report, Sep. 22, 2009, pp. 1-9.
Cederman, D. et al., "A Practical Quicksort Algorithm for Graphics Processors," Technical Report No. 2008-01, 2008, pp. 1-17.
de Berg, M. et al., "Computational Geometry: Algorithms and Applications," Springer, 2008, Third Edition, pp. 1-386.
Gunther, J. et al., "Realtime Ray Tracing on GPU with BVH-based Packet Traversal," To appear in the IEEE/Eurographics Symposium on Interactive Ray Tracing 2007, 2007, pp. 1-6.
Hunt, W. et al., "Fast kd-tree Construction with an Adaptive Error-Bounded Heuristic," 2006, pp. 1-8.
Horn, D. R. et al., "Interactive k-D Tree GPU Raytracing," ACM, Proceedings of the 2007 Symposium on Interactive 3D Graphics and Games, 2007, pp. 167-174.
Iray, Interactive Photorealistic Rendering Technology, mental images GmbH, Nov. 15, 2010, retrieved from http://web.archive.org/web/20101115074402/http://www.mentalimages.com/products/iray.html.
Keller, A. et al., "Quasi-Monte Carlo Progressive Photon Mapping," 2010, pp. 1-11.
Lauterbach, C. et al., "Fast BVH Construction on GPUs," Eurographics 2009, 2009, vol. 28, No. 2, pp. 1-10.
Lindholm, E. et al., "NVIDIA Tesla: A Unified Graphics and Computing Architecture," IEEE Micro, Mar.-Apr. 2008, pp. 39-55.
Lafortune, E. P. et al., "Bi-Directional Path Tracing," Proceedings of Compugraphics '93, Dec. 1993, pp. 145-153.
Nickolls, J. et al., "Scalable Parallel Programming with CUDA," ACM Queue, Mar.-Apr., 2008, pp. 42-53.
NVIDIA, "CUDA C Best Practices Guide," DG-05603-001_v4.0, May 2011, pp. 1-70.
NVIDIA, Optix, Jun. 6, 2011, http://web.archive.org/web/20110606070959/http://www.nvidia.com/object/optix.html.
Sengupta, S. et al., "Scan Primitives for GPU Computing," Graphics Hardware (2007), ACM, Aug. 4-5, 2007, pp. 97-106.
Spencer, B. et al., "Hierarchical Photon Mapping," IEEE Transactions on Visualization and Computer Graphics, Jan./Feb. 2009, vol. 15, No. 1, pp. 49-61.
Vaidya, P. M., "An O(n log n) Algorithm for the All-Nearest-Neighbors Problem," Discrete Comput Geom 4, 1989, pp. 101-115.
Wald, I. et al., "Balancing Considered Harmful—Faster Photon Mapping using the Voxel Volume Heuristic," Eurographics 2004, 2004, vol. 23, No. 3, pp. 1-9.
Wachter, C. et al., "Terminating Spatial Hierarchies by A Priori Bounding Memory," Technical Report, 2007, pp. 1-15.
Wang, R. et al., "An Efficient GPU-based Approach for Interactive Global Illumination," 2009, pp. 1-8.
Zomorodian, A. et al., "Fast Software for Box Intersections," International Journal of Computational Geometry & Applications, 2000, pp. 1-30.
Zhou, K. et al., "Real-Time KD-Tree Construction on Graphics Hardware," 2008, pp. 1-11.
Non-Final Office Action from U.S. Appl. No. 13/253,897, dated May 9, 2013.
Advisory Action from U.S. Appl. No. 13/253,897, dated Nov. 25, 2013.
Final Office Action from U.S. Appl. No. 13/253,897, dated Sep. 6, 2013.

* cited by examiner

SYSTEM, METHOD, AND COMPUTER PROGRAM PRODUCT FOR DETERMINISTICALLY SIMULATING LIGHT TRANSPORT

FIELD OF THE INVENTION

The present invention relates to graphics processing, and more particularly to light transport simulation.

BACKGROUND

In graphics processing, light transport simulation is utilized to generate graphical images in which light is being transported for example via specular or refractive surfaces. For example, such light transport may include light entering a car through a window, hitting the interior, and being transported back through the window to an outside observer, or the observation of a room through a mirror, where substantial illumination of the room is due to a small light source through the mirror.

In principle, light transport simulations sum up the contributions of all transport paths, which connect light sources with sensors. Traditionally, techniques providing numerical simulation have included bidirectional path tracing algorithms, where random walk methods are used to generate paths from the sensors and lights in order to connect them. However, there are common situations where establishing such connections by checking visibility using shadow rays can be arbitrarily inefficient. For example, in the context of bidirectional path tracing this problem has been characterized as the problem of "insufficient techniques" (see *Efficient bidirectional path tracing by randomized quasi-Monte Carlo integration*, by T. Kollig and A. Keller, Monte Carlo and Quasi-Monte Carlo Methods 2000 [H. Niederreiter, K. Fang, and F. Hickernell, eds.], Springer, 2002, pp. 290-305), in which unbiased Monte Carlo algorithms are unable to handle light transport due to specular surfaces in an efficient manner. To somebody skilled in the art, it is known, that deterministic methods can outperform randomized and/or unbiased algorithms with respect to the speed of convergence. In addition deterministic methods can be easily parallelized. However, such deterministic methods do not exist in the prior art of light transport simulation, where the problem of insufficient techniques is encountered.

There is thus a need for addressing these and/or other issues associated with the prior art.

SUMMARY

A system, method, and computer program product are provided for deterministically simulating light transport. In use, all pairs of non-negative integers are enumerated (e.g. in a predetermined order). Additionally, for each of the enumerated pairs of non-negative integers, an associated pair of a query point and a photon is identified by: identifying a query point associated with a first non-negative integer of the pair of non-negative integers using a deterministic point sequence of query points and identifying a photon associated with a second non-negative integer of the pair of non-negative integers using a deterministic point sequence of photons. Further, for each of the query points in the deterministic point sequence of query points, photons in the deterministic point sequence of photons associated with the query point are identified. Still yet, an illumination value is computed for each query point of each of the photons associated with the query point using the pairs of query points and photons and at least one transport property at the query point.

DETAILED DESCRIPTION

Figure 1:
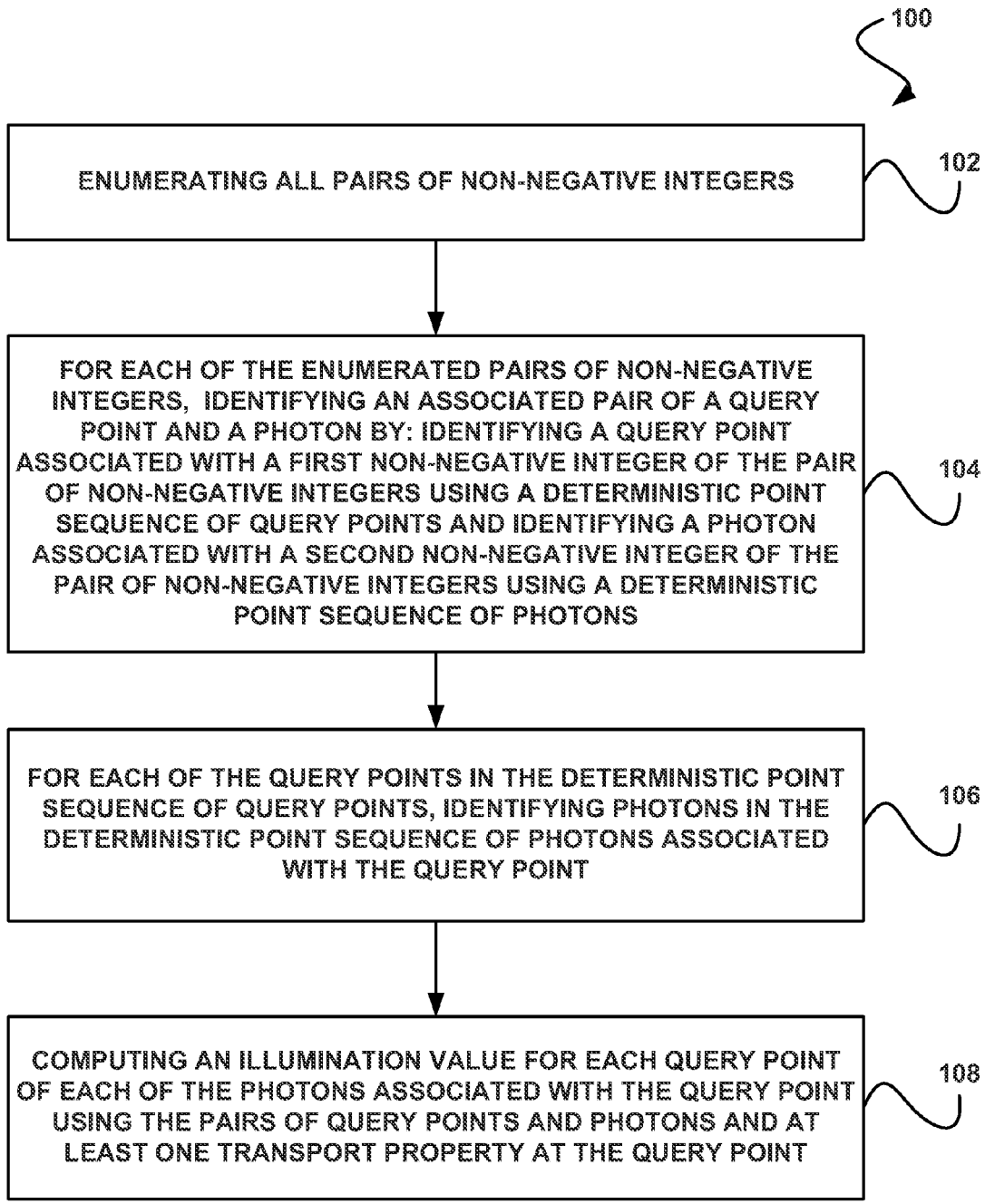
FIG. 1 shows a method for deterministically simulating light transport, in accordance with one embodiment.

FIG. 1 shows a method 100 for deterministically simulating light transport, in accordance with one embodiment. As shown in operation 102, all pairs of non-negative integers are enumerated (e.g. using a predetermined order). The pairs of non-negative integers may be enumerated between two sequences of non-negative integers using a predetermined order, where each of the pairs of non-negative integers includes a first non-negative integer from a first one of the sequences of non-negative integers and a second non-negative integer from a second one of the sequences of non-negative integers.

Further, the non-negative integers in each of the two sequences of non-negative integers may be indices to a respective deterministic point sequence of query points and deterministic point sequence of photons. Thus, the non-negative integers in the first one of the sequences of non-negative integers may be indices to a deterministic point sequence of query points. Similarly, the non-negative integers in the second one of the sequences of non-negative integers may be indices to a deterministic point sequence of photons. More information regarding such deterministic point sequences will be described below. Further, where the non-negative integers includes indices, as noted above, the first non-negative integer in an enumerated pair may include a first index in the deterministic point sequence of query points to the query point associated with the first non-negative integer, and the second non-negative integer may include a second index in the deterministic point sequence of photons to the photon associated with the second non-negative integer.

Figure 4A:
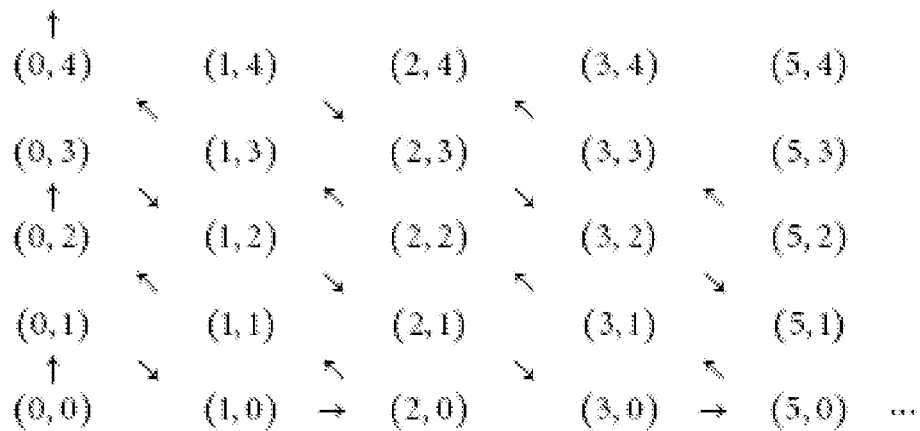
FIGS. 4A-B show systems for enumerating all combinations of integers, in accordance with still yet another embodiment.
Figure 4B:
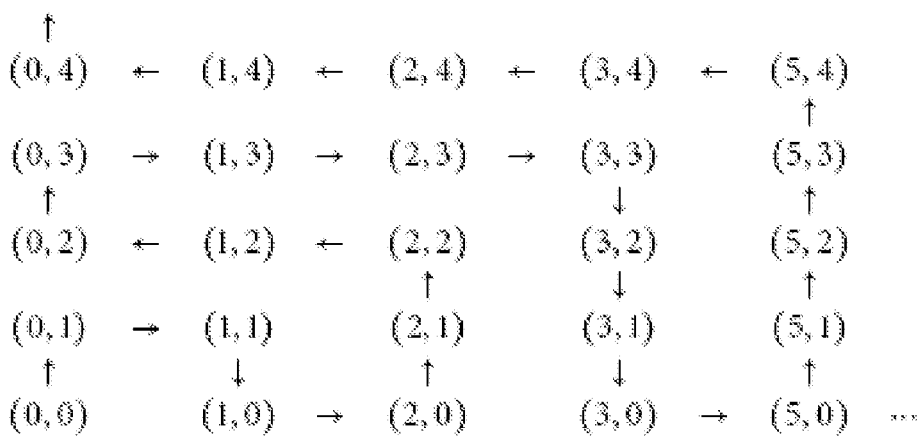

It should be noted that the pairs of non-negative integers may be enumerated in any manner. For example, the pairs of non-negative integers may be enumerated based on a predetermined order. In one embodiment, the pairs of non-negative integers may be enumerated in blocks with the predetermined order including a diagonal order (see FIG. 4A). In another embodiment, the pairs of non-negative integers may be enumerated in blocks with the predetermined order including a rectangular order (see FIG. 4B). Optionally, the aforementioned blocks may be of a predetermined size or may be of a size that is adaptively selected.

Additionally, as shown in operation 104, for each of the enumerated pairs of non-negative integers, an associated pair of a query point and a photon is identified by: identifying a query point associated with a first non-negative integer of the pair of non-negative integers using a deterministic point sequence of query points and identifying a photon associated with a second non-negative integer of the pair of non-negative integers using a deterministic point sequence of photons.

With respect to the present embodiment, the query points may include points found by tracing a transport path (e.g. starting from a viewpoint of the graphical image). Also with respect to the present embodiment, the photons may include those emitted from a light source. In one embodiment, the deterministic point sequence of query points and the deterministic point sequence of photons may each be generated using a low discrepancy point sequence, including a radical inverse based sequence or a rank-1 lattice sequence. The deterministic low discrepancy point sequences may optionally each be randomized by random scrambling or Cranley Patterson rotation.

Accordingly, for each of the pairs of query points and photons, the query point in the pair may determine a region, and the photon in such pair may include a photon emitted from the light source of the graphical image which intersects with the determined region. It should be noted that the rays emitted from the perspective source and the photons emitted from the light source may be scattered multiple times prior to defining or hitting the determined region, as described in more detail below with respect to FIG. 3.

As noted above, each non-negative integer in the first sequence of non-negative integers may include an index to a different query point included in the deterministic point sequence of query points, and each non-negative integer in the second sequence of non-negative integers may include an index to a different query point included in the deterministic point sequence of photons. Thus, identifying a pair of one of the query points and one of the photons for one of the enumerated pairs of non-negative integers may include identifying a query point in the deterministic point sequence of query points that is indexed by the first non-negative integer of the enumerated pair of non-negative integers, and further identifying a photon in the deterministic point sequence of photons that is indexed by the second non-negative integer of the enumerated pair of non-negative integers. By using the deterministic point sequence of query points and the deterministic point sequence of photons in the manner described above, random sampling of query points and photons may be avoided.

Further, as shown in operation 106, for each of the query points in the deterministic point sequence of query points, photons in the deterministic point sequence of photons associated with the query point are identified. Thus, for each query point, associated photons may be identified.

In one embodiment, the photons associated with a particular query point may include all photons within a predetermined region of the query point. Such predetermined region may include the determined region described above with respect to operation 104. For example, the predetermined region area may include a cube, sphere, etc. surrounding the particular query point.

Still yet, as shown in operation 108, an illumination value for each query point of each of the photons associated with the query point is computed using the pairs of query points and photons and at least one transport property at the query point. The illumination value may include a color for the query point. For example, the illumination value may include a color sample for a pixel associated with the query point (e.g. displaying the query point or averaging multiple color samples to compute the pixel color, etc.).

In one embodiment, the illumination value may be computed for the query point by aggregating surface properties (e.g. illumination values) for each of the photons associated with the query point and algorithmically combining the same with the transport property at the query point. Thus, the illumination value for the query point may be based on illumination values for photons determined to be associated with such query point. More information regarding algorithms for computing the illumination value for the query point is described below in detail.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
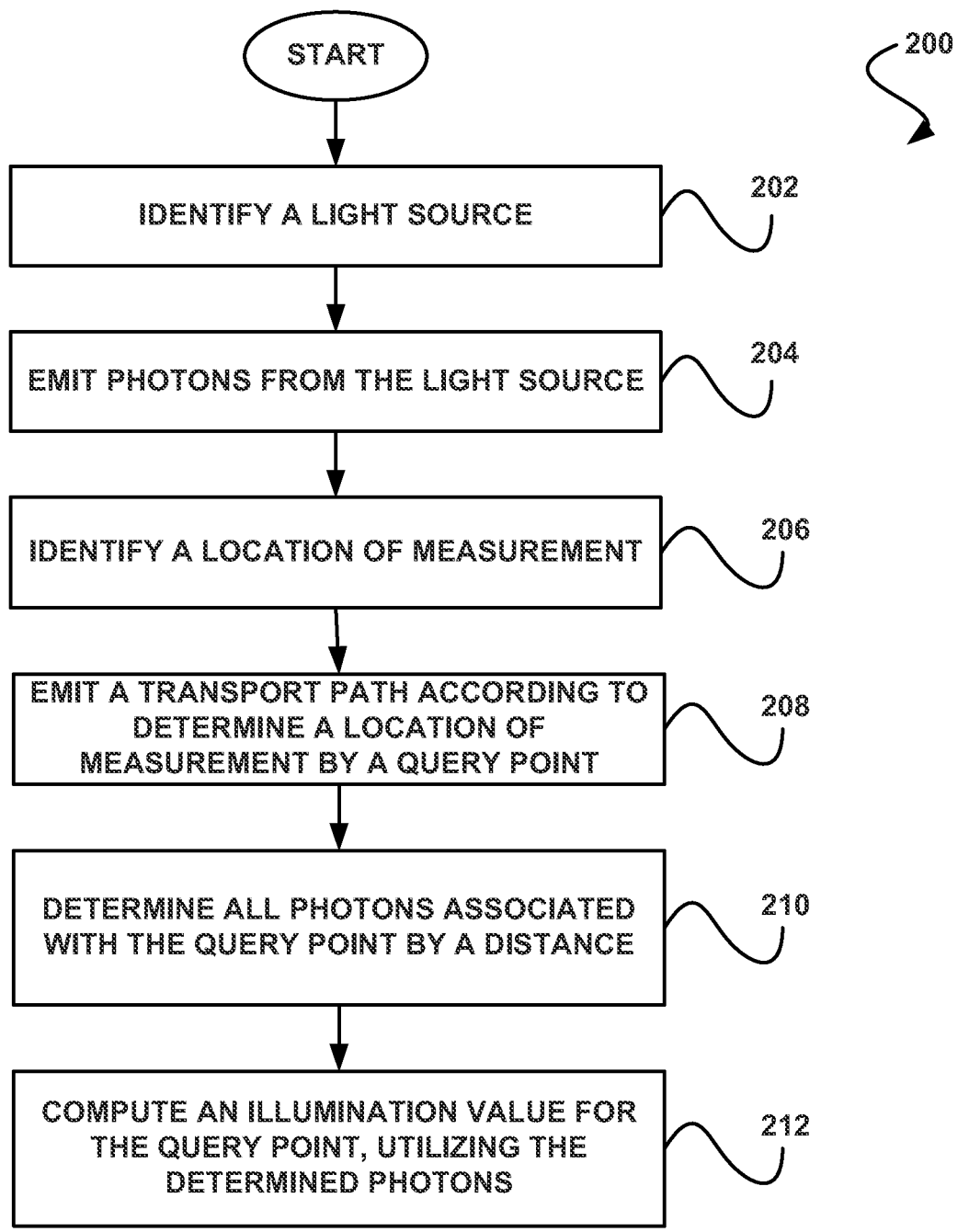
FIG. 2 shows a method for computing an illumination value for a point in a graphical image, in accordance with another embodiment.

FIG. 2 shows a method 200 for computing an illumination value for a point in a graphical image, in accordance with another embodiment. As an option, the present method 200 may be carried out in the context of the method 200 of FIG. 1. Of course, however, the method 200 may be carried out in any desired context. It should also be noted that the aforementioned definitions may apply during the present description.

As shown in operation 202, a light source to start a photon path is identified. The light source may include any source associated with a graphical image that provides light to at least a subset of pixels of the graphical image. For example, the light source may be shown on the graphical image, or may be outside of the graphical image but providing light on the graphical image from a particular direction.

Additionally, as shown in operation 204, photons are emitted from the light source. The photons may be emitted in a direction in which the light source emits light. Optionally, the number of photons emitted from the light source may be predetermined.

Further, as shown in operation 206, a location of measurement is identified. The location of measurement may include a predetermined region in space (e.g. a sphere or a disk, etc.). As shown in operation 208, a transport path is emitted to determine a location of measurement by a query point. Such transport paths may be emitted from a perspective source of the graphical image (e.g. a perspective of a user when viewing the graphical image). Such query point may result from the transport path being scattered across at least one surface (e.g. reflective surface) of the graphical image and hitting the location of measurement.

All photons associated with the query point by a distance are then determined, as shown in operation 210. Such photons may include those with points intersecting the predetermined region within the distance (e.g. predefined distance) of the query point.

Still yet, an illumination value for the query point is computed, utilizing the determined photons. Note operation 212. For example, radiance values of the determined photons may be combined for computing the illumination value for the query point. Various embodiments for carrying out the method 200 described above are provided below.

As described below, a simpler and more efficient deterministic photon mapping algorithm is provided with proven convergence. This photon mapping algorithm is based on sampling path space using quasi-Monte Carlo methods (*Random Number Generation and Quasi-Monte Carlo Methods*, by H. Niederreiter, SIAM, Philadelphia, 1992), which on the average allows for faster convergence as compared to Monte Carlo methods (*Average case complexity of multivariate integration*, by H. Wozniakowski, Bull. Amer. Math. Soc. 24 [1991], 185-194). As a consequence of the deterministic nature, parallelization is simplified and results can be exactly reproduced even in a heterogenous computing environment.

Figure 3:
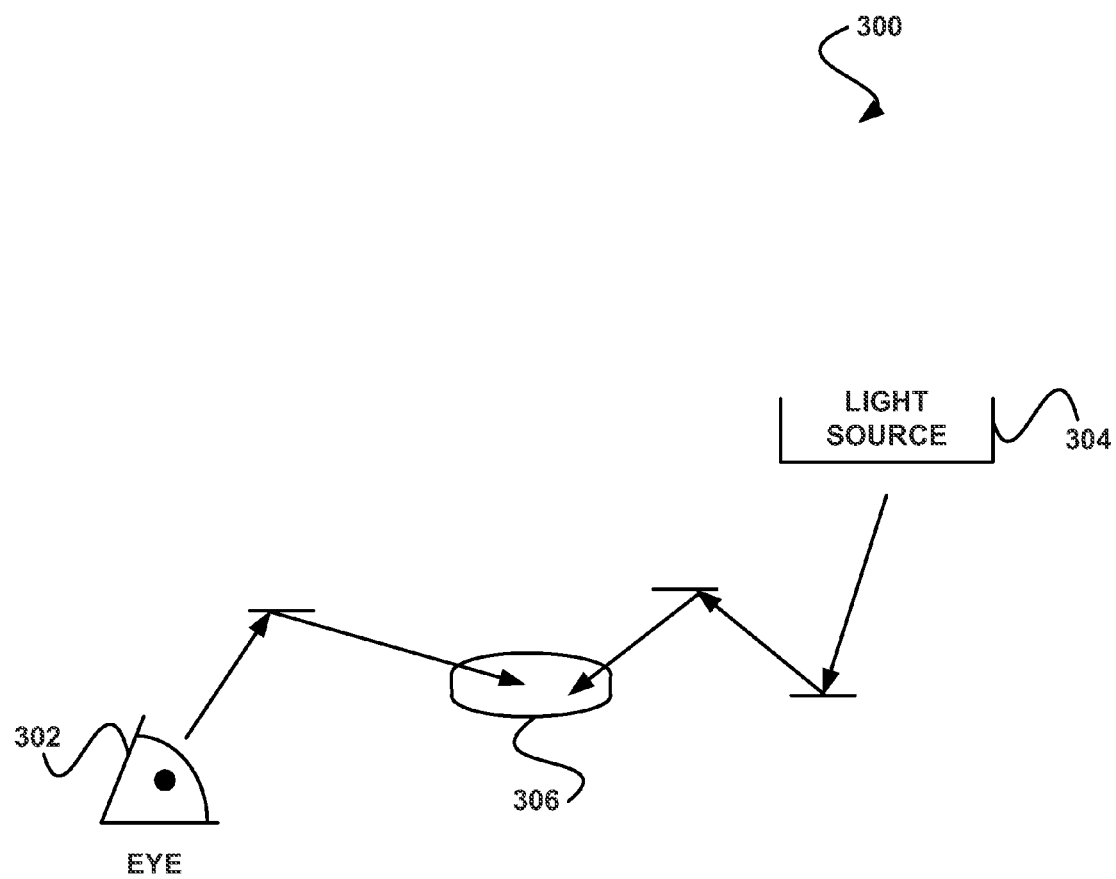
FIG. 3 shows a principle method of photon mapping, in accordance with yet another embodiment.

The principle of the aforementioned photon mapping algorithms is illustrated in FIG. 3, in which an eye 302 looking at a reflective surface is able to view a point in a graphical image 300 otherwise not in the line of the sight of the eye 302 (i.e. not visible to the eye 302). Specifically, as shown, the query point 302 defines a tangential disk 306. Similarly, a light source 304 of the graphical image 300 (which may or may not be visible) emits photons in the direction of a reflective surface, such that the photons may be scattered off of none or at least one reflective surface and hit the disk 306. Any desired technique for generating such paths from a sensor (e.g. the eye 302) and from the light source 304 may be utilized.

The radiance shown in Equation #1 is estimated (*Realistic Image Synthesis Using Photon Mapping*, by H. Jensen, A K Peters, 2001, Sec. 7.2, Eq. 7.6) by determining a set $\mathcal{B}$x of photons p with respect to the query point (i.e. the point of intersection on of the disk 306 by the ray emitted from the eye 302) and summing up their incident flux $\Delta\Phi_p$ attenuated by the bidirectional scattering distribution function (BSDF) $f_s$, where $\omega$ is the direction of observation and $\omega_p$ is the direction of incidence of photon p. The radiance then is approximated by dividing the sum by the area of a disk of radius r.

$$L(x, \omega) \approx \frac{1}{\pi r^2} \sum_{p \in \mathcal{B}_x} f_s(\omega, x, \omega_p) \Delta\Phi_p \qquad \text{Equation \#1}$$

Photon mapping is strongly related to density estimation, where the radius is called smoothing parameter or smoothing length (*Density Estimation for Statistics and Data Analysis*, by B. Silverman, Chapman & Hall/CRC, 1986, Sec. 3.4). Proofs of the consistency of density estimation [*Density Estimation for Statistics and Data Analysis*, by B. Silverman, Chapman & Hall/CRC, 1986, Sec. 3.7.1, Sec. 3.7.2] are based on choosing the radius in reciprocal dependence of the number n of emitted particles. Equation #2 is provided, where the squared radius in Equation #2 is chosen in dependence of the number n of emitted photons and an initial radius $r_0(x)>0$.

$$L(x, \omega) = \lim_{n \to \infty} \frac{1}{\pi \cdot r^2(x, n)} \sum_{p \in \mathcal{B}(x, r(x,n))} f_s(\omega, x, \omega_p) \Delta\Phi_p \qquad \text{Equation \#2}$$

$$r^2(x, n) := \frac{r_0^2(x)}{n^\alpha} \qquad \text{Equation \#3}$$

for $0 < \alpha < 1$

Thus, the radius of a predetermined area may be defined based on the number of photons emitted from the light source for locally estimating radiance or estimating functionals within finite bounds. $\mathcal{B}(x, r(x, n))$ is the set of all photons in the ball of radius $r(x,n)$ around the point x. The explicit dependence on a location x allows for choosing an initial $r_0$ in dependence of an initial photons distribution, similar to (*Progressive photon mapping*, by T. Hachisuka, S. Ogaki, and H. Jensen, ACM Transactions on Graphics 27 [2008], no. 5, 130:1-130:8; and *Stochastic progressive photon mapping*, by T. Hachisuka and H. Jensen, SIGGRAPH Asia '09: ACM SIGGRAPH Asia 2009 papers [New York, N.Y., USA], ACM, 2009, pp. 1-8).

The radiance estimator shown in Equation #4 results from including the number n of emitted photons in the photon flux $$\Delta\Phi_p := \frac{\phi_p}{n}$$

and inserting it into Equation #2.

$$l_n(x, \omega) := \frac{n^\alpha}{n \cdot \pi \cdot r_0^2(x)} \sum_{p \in \mathcal{B}(x, r(x,n))} f_s(\omega, x, \omega_p) \phi_p \qquad \text{Equation \#4}$$

The radiance estimator can be generalized by using any other kernel that in the limit results in a Dirac-δ distribution. Such kernels, other than the characteristic function of the set $\mathcal{B}$ (x, r(x, n)) are found in (*Density Estimation for Statistics and Data Analysis*, by B. Silverman, Chapman & Hall/CRC, 1986) or in the domain of smoothed particles hydrodynamics (SPH). In analogy with the SPH approach, using the derivative of such a kernel, allows one to compute irradiance gradients.

Due to the postulate $0<\alpha<1$, we have $$\frac{n^\alpha}{n} < 1$$

(for n>1). Therefore $L_n$ will always be bounded if $f_s$ is bounded at the position x where the photons are collected. While the boundedness guarantees finite variance, it remains to show that the variance vanishes with $n \to \infty$.

Since light transport is a linear problem, the number of photons in $\mathcal{B}$ (x, r(x, n)) asymptotically must be linear in n: For $\alpha=1$ doubling the number n of emitted photons results in half the squared radius, i.e. area, however, the same number of photons in $\mathcal{B}$ (x, r(x, n)). Therefore the condition $0<\alpha<1$ guarantees that the radius decreases slower than the increase in photons. As a consequence more and more photons are collected with increasing n and the variance asymptotically vanishes.

Equation #2 does neither converge for $\alpha=0$, because the initial radius will not be decreased, nor for $\alpha=1$ as the noise level does not decrease. This can be easily verified by running the algorithm with either one of the extremal values. Comparing the graphs of $$\frac{n^\alpha}{n}$$

for the two extreme cases reveals that $\alpha=\frac{1}{2}$ in fact best balances the two interests of fast convergence and noise reduction.

The consistency of the estimator shown in Equation #4 guarantees that typical photon mapping artifacts, like for example light leaks, vanish. However, taking a look at the limes ratio:

$$\lim_{n \to \infty} \frac{r^2(x, n+1)}{r^2(x, n)} = \lim_{n \to \infty} \frac{n^\alpha}{(n+1)^\alpha} = \lim_{n \to \infty} \left(\frac{n}{n+1}\right)^\alpha = 1$$

of the (n+1)-st and n-th squared radius reveals that the squared radius and thus visual artifacts are vanishing arbitrarily slow.

As a consequence, a larger value of α is only effective for smaller n and therefore the initial radius $r_0$ becomes most influential. However, competing goals need to be satisfied: in favor of efficiency a smaller radius requires less photons to be averaged, while on the other hand a larger radius allows for more efficient noise reduction by averaging more photons.

While a local initial radius allows for adapting to photon density and thus a better tradeoff between noise and smoothing, it requires to retrieve $r_0(x)$. For example $r_0(x)$ can be obtained from an initial set of photons in analogy to the original photon mapping algorithm. Alternatively an individual radius can be stored for each functional, for example each pixel, to be computed. If in addition $r_0(x)$ can be bounded efficiently, for example by determining its maximum, the efficiency of nearest neighbor search can be improved by pruning of branches in a kd-tree. Note that decreasing the initial radius during the course of computation is possible without interfering with the convergence properties.

Of course the simplest choice is a global initial radius $r_0$, which may be chosen rather smaller than larger, as noise may be preferable compared to the other temporary photon mapping artifacts.

While the estimator of Equation #4 computes the flux through a planar disk, it is practical to collect all photons inside a ball around the query point. Similar to (*Strictly Deterministic Sampling Methods in Computer Graphics*, SIGGRAPH 2003 Course Notes, Course #44: Monte Carlo Ray Tracing [2003]) photons inside the ball can be tested for intersection with a tangential disk defined around the query point. Including this test allows for eliminating the typical overmodulation in the proximity of concave geometry, especially in corners.

In fact Equation #4 can be considered an integro-approximation problem: Given one set of photons generated by n paths started at the light sources, the radiance $L_n$ is defined for any location x and any direction ω.

This allows one to compute the color (via the approximation in Equation #6 of Equation #5) of a pixel P using an infinite sequence of uniform samples $x_q$ to determine query locations h ($x_q$): The $x_q$ define eye paths, where $W(x_q)$ is the accumulated weight along the path, which is multiplied by the radiance $L(h(x_q), \omega(x_q))$. The paths associated with the pixel P are selected by the characteristic function $\chi_P$, while |P| is the area of pixel P.

$$L_P := \lim_{m \to \infty} \frac{|P|}{m} \sum_{q=0}^{m-1} \chi_P(x_q) W(x_q) L(h(x_q), \omega(x_q)) \quad \text{Equation \#5}$$

$$= \lim_{m \to \infty} \frac{|P|}{m} \sum_{q=0}^{m-1} \chi_P(x_q) W(x_q) \lim_{n \to \infty} L_n(h(x_q), \omega(x_q))$$

$$\approx \frac{|P|}{mn} \sum_{q=0}^{m-1} \chi_P(x_q) W(x_q) \quad \text{Equation \#6}$$

$$\frac{n^\alpha}{\pi \cdot r_0^2(h(x_q))} \cdot \sum_{p \in \mathcal{B}(h*x_q), r(h(x_q),n))} f_s(\omega(x_q), h(x_q), \omega_p) \phi_p$$

Computing the functional shown in Equation #5 requires to enumerate all pairs of indices (q, p) of query paths and photons. This way each query location $h(x_q)$ can interact with all photons, which guarantees the pointwise convergence of Equation #4 and consequently the approximation in Equation #6 is consistent.

As derived above, each query location must interact with all photons, which requires to enumerate all pairs of query path and light path indices. Therefore $\mathbb{N}_0 \times \mathbb{N}_0$ is partitioned into contiguous blocks of each $m_b$ query location indices times $n_b$ light path indices. The ratio $$\frac{m_b}{n_b}.$$

allows for balancing anti-aliasing and photon density. The blocks are enumerated using the index i along the dimension of query paths and j along the dimension of light paths.

It may be most efficient to keep as many query locations and photons as possible in memory. However, as an unavoidable consequence of finite memory, both query locations and photons may need to be recomputed. This excess amount of computation depends on the order of how the blocks are enumerated. While the diagonal order in FIG. 4A requires permanent recomputation, the rectangular order in FIG. 4B allows for frequent reuse of either the set of query locations or the set of photons.

Efficient C++ code for such space filling curves is found in Table 1 and Table 2, respectively. Table 3 realizes the same order as Table 2, however, it implements direct block access, which allows for parallelization without communication or synchronization.

The rigid partition into blocks of equal size can be avoided by generating query locations and photons until a given block of memory is filled. The resulting starting indices $n_i$ and $m_j$ for the query locations and light paths, respectively, are stored in an array each in order to allow for the direct retrieval of the i-th range $n_i, \ldots, n_{i+1}-1$ of query paths and the j-th range $m_j, \ldots, n_{j+1}-1$ of light paths.

TABLE 1

//C++ code for the diagonal enumeration of all integer pairs

```
#include <iostream>
using namespace std;
int main (int argc, char * const argv[ ])
{
    bool Up = true;
    int B1 = 1;
    int B2 = 1;
    for(int i = 0; i < 20; i++)
    {
        cout << B1 << " " << B2 << endl;
        if(Up)
        {
            B2++;
            if(B1 > 1)
                B1--;
            else
                Up = false;
        }
        else
        {
            B1++;
            if(B2 > 1)
                B2--;
            else
                Up = true;
        }
    }
    return 0;
}
```

TABLE 2

//C++ code for the more coherent enumeration of all integer pairs

```
#include <iostream>
using namespace std;
int main (int argc, char * const argv[ ])
{
    enum Directions {Up, Right, Down, Left} State = Up;
    int B1 = 0;
    int B2 = 0;
    for(int i = 0; i < 20; i++)
    {
        cout << B1 << " " << B2 << endl;
        switch(State)
        {
            case Up:
                B2++;
                if(B1 == 0)
                    State = Right;
                else if(B1 == B2)
                    State = Left;
                break;
            case Right:
                B1++;
                if(B2 == 0)
                    State = Up;
                else if(B1 == B2)
                    State = Down;
                break;
            case Down:
                B2--;
                if(B2 == 0)
                    State = Right;
                break;
            case Left:
                B1--;
                if(B1 == 0)
                    State = Up;
                break;
        }
    }
}
```

TABLE 3

//Non-interative C++ code for the same enumeration as shown in Table 2
```
#include <iostream>
#include <utility>
#include <cmath>
using namespace std;
inline int isqrt(int i)
{
    return static_cast<int>(sqrt(static_cast<double>(i)));
}
typedef pair<int, int> Block;
Block get_block(const int index)
{
    //   0--1  2--3  4
    //   |  |  |  |  |
    //   1--1  2  3  4
    //   |     |  |  |
    //   2--2--2  3  4
    //            |  |
    //   3--3--3--3  4
    //               |
    //   4--4--4--4--4
    const int row = isqrt(index);
    const int off = index - row * row;
    const int x = (off >= row) ? row : off;
    const int y = (off >= row) ? row + row - off : row;
    return !(row & 1) ? Block(x, y) : Block(y, x);
}
int main(int, char**)
{
    for (int i = 0; i < 30; ++i)
    {
```

TABLE 3-continued

```
        const Block b = get_block(i);
        cout << i << ":" << b.first << "," <<b.second <<endl;
    }
    return 0;
}
```

If the number n of light paths can be fixed in advance, the radius r(x, n) will be used throughout the computation and the sums will be weighted by $$\frac{1}{mn}.$$

as shown in Equation #6. If the ultimate value of n is unknown, the computation will have to be conducted in a progressive way. The weight for the intermediate results then amounts to the reciprocal of the number of currently processed blocks multiplied by $m_b n_b$, which is the number processed pairs of query points and light paths. Thus, a result may be computed in a progressive manner or for a fixed number of light and photon paths.

A block with light path block index j is processed using the radius $r(x, j \cdot n_b)$. Note that the algorithm in Equation #5 remains consistent, because the weight of each single summand decreases with increasing number of blocks. As j increases, less photons interact with the query locations, since the query radius decreases. This can be interpreted as slight blur that sharpens with progress of the computation. As the radius decreases arbitrarily slow, as described above, this effect is hardly visible, which again emphasizes that the choice of the initial radius is much more important than the overall progression of the radius.

Pseudo-random number generators in fact are deterministic algorithms that try to mimic random numbers. However, the approximate independence of pseudo-random numbers is no longer visible once the samples are averaged. More important, the speed of convergence depends on the uniformity of the samples. In that respect deterministic low discrepancy sequences are preferable, as they are more uniform as compared to random samples and therefore improve the speed of convergence (*Random Number Generation and Quasi-Monte Carlo Methods*, by H. Niederreiter, SIAM, Philadelphia, 1992; and *Myths of computer graphics*, Monte Carlo and Quasi-Monte Carlo Methods 2004 [H. Niederreiter, ed.], Springer, 2006, pp. 217-243). Finally, such deterministic algorithms are simple to parallelize in heterogeneous computing environments and results are exactly reproducible.

Interpreting the radiance estimator shown in Equation #4 as an integro-approximation problem allows for applying the results of (*Myths of computer graphics*, Monte Carlo and Quasi-Monte Carlo Methods 2004 [H. Niederreiter, ed.], Springer, 2006, pp. 217-243, Theorem 1), which guarantee that generating the photons using deterministic low discrepancy sequences (*Random Number Generation and Quasi-Monte Carlo Methods*, by H. Niederreiter, SIAM, Philadelphia, 1992) results in a consistent deterministic estimation with all the aforementioned advantages, for example.

With the pointwise convergence of the radiance estimate established, any consistent quadrature rule can be used for sampling the query location paths. Especially, the same low discrepancy sequence as used for photon generation can be applied, which simplifies implementations.

Constructions of low discrepancy sequences are found in (*Random Number Generation and Quasi-Monte Carlo Meth-*

*ods*, by H. Niederreiter, SIAM, Philadelphia, 1992). Images may be computed using the Halton sequence. The theoretical results may be verified using fast implementations of (t, s)-sequences in base b, especially the Sobol' sequence (*Uniformly Distributed Sequences with an additional Uniform Property*, by 1. Sobol', Zh. Vychisl. Mat. mat. Fiz. 16 [1976], no. 5, 1332-1337; and *Quasi-Monte Carlo Light Transport Simulation by Efficient Ray Tracing*, by C. Wächter, Ph. D. thesis, Universität Ulm, 2008), and rank-1 lattices sequences (*Extensible lattice sequences for quasi-Monte Carlo quadrature*, by F. Hickernell, H. Hong, P. L'Ecuyer, and C. Lemieuk, SIAM J. Sci. Comput. 22 [2001], 1117-1138).

Note that the point sequences must be dimension extensible in order to account for potentially infinite length transport paths, which in theory would rule out rank-1 lattices and constructions similar to the Faure sequences (*Discrépance de suites associées a un système de numeration (en dimension s)*, by H. Faure, Acta Arith. 41 no. 4, 337-351). However, due to finite precision, path length cannot be infinite on a computer and it is reasonable and acceptable to limit path length by a sufficiently large bound. While in theory this leads to inconsistent results, in practice the resulting bias is not observable in most cases.

For the sake of completeness, the algorithms derived above work with any point sequence that is uniform, i.e. has vanishing discrepancy. This includes random, pseudo-random, or randomized point sequences such as for example randomized low discrepancy sequences.

The paths resulting in the query points are generated by sampling the whole image plane or tiles thereof instead of sampling on a pixel-by-pixel basis. While it is possible to simply map the image plane or tiles thereof to the unit square, it may be preferable to directly map pixels to sample indices (*Strictly Deterministic Sampling Methods in Computer Graphics*, SIGGRAPH 2003 Course Notes, Course #44: Monte Carlo Ray Tracing (*Myths of computer graphics*, Monte Carlo and Quasi-Monte Carlo Methods 2004 [H. Niederreiter, ed.], Springer, 2006, pp. 217-243; and *On enumerationg certain quasi-Monte Carlo sequences in voxels*, by M. Raab, L. Grünschloβ, J. Abramov, and A. Keller, patent application MENT-104-B, mental images GmbH, 2009).

Thus, as described above, quasi-Monte Carlo progressive photon mapping may be provided. Based on the principles of enumerating all pairs of non-negative integers, convergence has been proven for the deterministic case.

The simple derivation and algorithmic principle enable the deterministic and consistent computation of many more linear problems as for example all kinds of (bidirectional) path tracing, where query and light paths are connected by shadow rays. If path space sampling is extended to consider participating media, the proposed schemes generalize to volume scattering as well.

Figure 5:
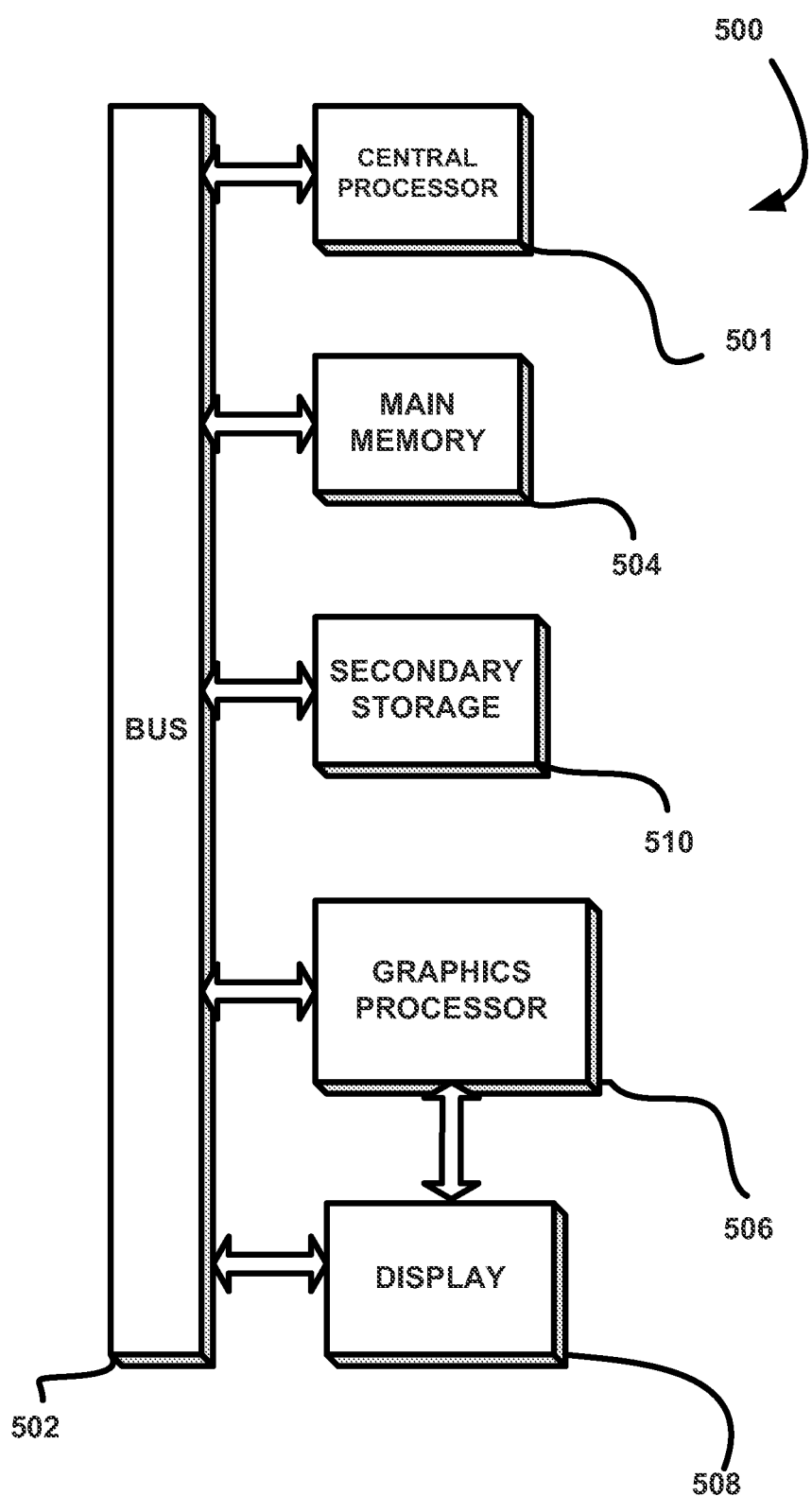
FIG. 5 illustrates an exemplary system in which the various architectures and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter. The system may as well be realized using configurable hardware such a FPGA components.

Still yet, the architecture and/or functionality of the various previous figures may be implemented in the context of a general computer system, a circuit board system, a game console system dedicated to entertainment purposes, an application-specific system, and/or any other desired system. For example, the system 500 may take the form of a desktop computer, lap-top computer, and/or any other type of logic. Still yet, the system 500 may take the form of various other devices including, but not limited to a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium for deterministically simulating light transport, comprising:
   computer code for enumerating, using one of a predetermined rectangular order and a predetermined diagonal order, all pairs of non-negative integers, wherein each of the pairs of non-negative integers includes:
   a first non-negative integer that is an index to a deterministic point sequence of query points, and
   a second non-negative integer that is an index to a deterministic point sequence of photons;

for each of the enumerated pairs of non-negative integers, computer code for identifying an associated pair of a query point and a photon by:
  identifying a query point in the deterministic point sequence of query points that is indexed by the first non-negative integer of the pair of non-negative integers, wherein the query point determines a region and a radius of the determined region is defined based on an initial radius and using a number n of photons emitted from a light source for locally estimating radiance or estimating functionals within finite bounds, and
  identifying a photon in the deterministic point sequence of photons that is indexed by the second non-negative integer of the pair of non-negative integers, wherein the photon intersects the region determined by the query point;
for each of the query points in the deterministic point sequence of query points, computer code for identifying photons in the deterministic point sequence of photons within the region determined by the query point; and
computer code for computing an illumination value for each of the query points using each of the photons within the region determined by the query point using the pairs of query points and photons and at least one transport property at the query point;
wherein the computer program product is operable such that each of the pairs of non-negative integers are enumerated between two sequences of non-negative integers using the predetermined order, such that each of the pairs of non-negative integers includes the first non-negative integer from a first one of the sequences of non-negative integers and the second non-negative integer from a second one of the sequences of non-negative integers.

2. The computer program product of claim 1, wherein the computer program product is operable such that the pairs of non-negative integers are enumerated in blocks.

3. The computer program product of claim 2, wherein the blocks are of a predetermined size or an adaptively selected size.

4. The computer program product of claim 2, further including, after enumerating the pairs of non-negative integers in the blocks, storing in a first array a first index to the deterministic point sequence of query points, and storing in a second array a first index to the deterministic point sequence of photons.

5. The computer program product of claim 1, wherein the enumeration is utilized to enumerate query paths and photon paths that are connected by shadow rays.

6. The computer program product of claim 1, wherein the computer program product is operable such that the initial radius is selected as one of global, local to functional, and local to a domain of simulation.

7. The computer program product of claim 1, further comprising computer code for projecting photons to a tangential disk, for identifying the photons within the region determined by the query point.

8. The computer program product of claim 1, wherein the computer program product is operable such that a selected kernel function is utilized in association with a radiance estimator, and derivatives are computed by using a derivative of the kernel function.

9. The computer program product of claim 1, wherein the computer program product is operable such that a result is computed in a progressive manner or for a fixed number of light and photon paths.

10. The computer program product of claim 1, wherein the deterministic point sequence of query points and the deterministic point sequence of photons each is generated using a low discrepancy point sequence, including at least one of a radical inverse based sequence and a rank-1 lattice sequence.

11. The computer program product of claim 10, wherein the computer program product is operable such that the deterministic low discrepancy point sequences are each randomized by random scrambling or Cranley Patterson rotation.

12. The computer program product of claim 1, wherein the computer program product is operable such that the query points are identified across a screen or across a tile of the screen.

13. The computer program product of claim 1, wherein the computer program product is operable such that the illumination value is computed for simulating all light transport for a graphical image or a subset of light transport.

14. The computer program product of claim 1, wherein the determined region is an area of a disk, and the locally estimated radiance is approximated by dividing a sum by the determined region of the disk.

15. The computer program product of claim 1, wherein the enumeration using the predetermined order causes each of the query points to interact with all of the photons.

16. The computer program product of claim 1, wherein the illumination value is computed for each of the query points by aggregating surface properties for each of the photons associated with the query point and combining the aggregated surface properties with the at least one transport property at the query point.

17. The computer program product of claim 1, wherein the radius of the determined region is calculated as:

$$r^2(x, n) := \frac{r_0^2(x)}{n^\alpha},$$

wherein the initial radius, $r_0$ is greater than 0, r is the radius, x is a given point, and $0<\alpha<1$.

18. A method for deterministically simulating light transport, comprising:
  enumerating, using one of a predetermined rectangular order and a predetermined diagonal order, all pairs of non-negative integers, wherein each of the pairs of non-negative integers includes:
    a first non-negative integer that is an index to a deterministic point sequence of query points, and
    a second non-negative integer that is an index to a deterministic point sequence of photons;
  for each of the enumerated pairs of non-negative integers, identifying an associated pair of a query point and a photon by:
    identifying a query point in the deterministic point sequence of query points that is indexed by the first non-negative integer of the pair of non-negative integers, wherein the query point determines a region and a radius of the determined region is defined based on an initial radius and using a number n of photons emitted from a light source for locally estimating radiance or estimating functionals within finite bounds, and
    identifying a photon in the deterministic point sequence of photons that is indexed by the second non-negative integer of the pair of non-negative integers, wherein the photon intersects the region determined by the query point;

for each of the query points in the deterministic point sequence of query points, identifying photons in the deterministic point sequence of photons within the region determined by the query point; and computing an illumination value for each of the query points using each of the photons within the region determined by the query point using the pairs of query points and photons and at least one transport property at the query point;

wherein each of the pairs of non-negative integers are enumerated between two sequences of non-negative integers using the predetermined order, such that each of the pairs of non-negative integers includes the first non-negative integer from a first one of the sequences of non-negative integers and the second non-negative integer from a second one of the sequences of non-negative integers.

19. An apparatus for deterministically simulating light transport, comprising:

a processor for:

enumerating, using one of a predetermined rectangular order and a predetermined diagonal order, all pairs of non-negative integers, wherein each of the pairs of non-negative integers includes:

a first non-negative integer that is an index to a deterministic point sequence of query points, and a second non-negative integer that is an index to a deterministic point sequence of photons;

for each of the enumerated pairs of non-negative integers, identifying an associated pair of a query point and a photon by:

identifying a query point in the deterministic point sequence of query points that is indexed by the first non-negative integer of the pair of non-negative integers, wherein the query point determines a region and a radius of the determined region is defined based on an initial radius and using a number n of photons emitted from a light source for locally estimating radiance or estimating functionals within finite bounds, and identifying a photon in the deterministic point sequence of photons that is indexed by the second non-negative integer of the pair of non-negative integers, wherein the photon intersects the region determined by the query point;

for each of the query points in the deterministic point sequence of query points, identifying photons in the deterministic point sequence of photons within the region determined by the query point; and computing an illumination value for each of the query points using each of the photons within the region determined by the query point using the pairs of query points and photons and at least one transport property at the query point;

wherein the apparatus is operable such that each of the pairs of non-negative integers are enumerated between two sequences of non-negative integers using the predetermined order, such that each of the pairs of non-negative integers includes the first non-negative integer from a first one of the sequences of non-negative integers and the second non-negative integer from a second one of the sequences of non-negative integers.

20. The apparatus of claim 19, wherein the processor remains in communication with memory and a display via a bus.

* * * * *